(12) United States Patent
Furuta et al.

(10) Patent No.: US 12,215,768 B2
(45) Date of Patent: Feb. 4, 2025

(54) STRAIN WAVE GEARING

(71) Applicant: HARMONIC DRIVE SYSTEMS INC., Tokyo (JP)

(72) Inventors: Kazumasa Furuta, Azumino (JP); Nozomu Tanioka, Azumino (JP); Jun Handa, Azumino (JP)

(73) Assignee: HARMONIC DRIVE SYSTEMS INC., Tokyo (JP)

( * ) Notice: Subject to any disclaimer, the term of this patent is extended or adjusted under 35 U.S.C. 154(b) by 0 days.

(21) Appl. No.: 18/164,856

(22) Filed: Feb. 6, 2023

(65) Prior Publication Data

US 2024/0044400 A1    Feb. 8, 2024

(30) Foreign Application Priority Data

Aug. 2, 2022  (JP) ................................ 2022-123606

(51) Int. Cl.
  *F16H 49/00*  (2006.01)
(52) U.S. Cl.
  CPC .................................. *F16H 49/001* (2013.01)
(58) Field of Classification Search
  CPC .............................. F16H 49/001; B25J 9/1025
  See application file for complete search history.

(56) References Cited

U.S. PATENT DOCUMENTS

| | | | |
|---|---|---|---|
| 2007/0110555 A1* | 5/2007 | Ono ........................ | F16H 21/04 |
| | | | 414/744.5 |
| 2016/0109014 A1* | 4/2016 | Murayama ............ | F16C 33/586 |
| | | | 74/640 |
| 2019/0203817 A1* | 7/2019 | Xiong .................... | F16H 49/001 |
| 2020/0292046 A1* | 9/2020 | Imagawa ................. | B25J 9/102 |
| 2023/0235815 A1* | 7/2023 | Cao ....................... | F16H 57/0454 |
| | | | 74/89.22 |

FOREIGN PATENT DOCUMENTS

| | | | | |
|---|---|---|---|---|
| CN | 110159729 A | * | 8/2019 | |
| ES | 2373493 A1 | * | 2/2012 | ........... F16H 49/001 |
| JP | 2020060196 A | | 4/2020 | |
| JP | 2022077564 A | | 5/2022 | |
| WO | WO-2019093306 A1 | * | 5/2019 | ............... F16H 1/32 |

OTHER PUBLICATIONS

English translation of CN 110159729 A (Year: 2019).*
English translation of ES 2373493 A1 (Year: 2012).*
English translation of WO 2019093306 A1 (Year: 2019).*

* cited by examiner

*Primary Examiner* — Joseph Brown
(74) *Attorney, Agent, or Firm* — Buchanan Ingersoll & Rooney PC

(57) ABSTRACT

In a strain wave gearing, both of a pulley for transmitting rotation in a direction orthogonal to a rotation central axis and an output shaft are arranged on an axial-direction first side relative to a cup-shaped externally toothed gear. The input shaft, which transmits input rotation from the pulley to the wave generator, functions as a support shaft for both the pulley and the wave generator and is supported at both ends by the first and second bearings. A mechanism for transmitting rotation from the pulley to the wave generator, and a mechanism for supporting the rotation-transmitting mechanism, can be made compact, and support strength can also be ensured.

6 Claims, 4 Drawing Sheets

STRAIN WAVE GEARING

TECHNICAL FIELD

The present invention relates to a strain wave gearing provided with a pulley, a spur gear, or another rotation-transmitting member by which rotation is transmitted from a direction orthogonal to a rotation central axis.

BACKGROUND ART

In this type of strain wave gearing, rotation outputted by a motor arranged in parallel is transmitted and reduced via a pulley-and-belt-type rotation-transmitting mechanism or a reduction gear train, and the reduced rotation is transmitted to a load side. Alternatively, reduced rotation outputted from the strain wave gearing is transmitted to the load side via the pulley-and-belt-type rotation-transmitting mechanism or the reduction gear train. For example, Patent Literature 1 discloses a flat strain wave gearing in which a driven-side pulley to which rotation is inputted is arranged at one axial-direction end, and a reduced-rotation-outputting shaft is arranged at the other end. Patent Literature 2 discloses a cup-shaped strain wave gearing in which an input shaft protrudes toward one axial-direction side, and a pulley attached to a reduced-rotation-outputting shaft is arranged on the other side.

PRIOR-ART LITERATURE

Patent Literature

Patent Literature 1: JP 2022-77564 A
Patent Literature 2: JP 2020-60196 A

DISCLOSURE OF THE INVENTION

Problems to be Solved by the Invention

In a strain wave gearing to which a pulley, a spur gear, or another rotation-transmitting member is attached, the device dimensions, particularly the axial-direction dimensions, are increased for the purpose of attaching the rotation-transmitting member and a mechanism for supporting the same. There are cases where, if a pulley or other support mechanism is arranged inside the strain wave gearing in order to avoid any increase in dimensions and make the device more compact, sufficient support strength cannot be obtained due to constraints regarding the bearing size and arrangement.

It is an object of the present invention to provide a strain wave gearing provided with a rotation-transmitting member for transmitting rotation in a direction orthogonal to a rotation central axis, the strain wave gearing being provided with a structure that is advantageous for making the strain wave gearing flatter and more compact. It is also an object of the present invention to provide a strain wave gearing provided with a structure that is advantageous for making the strain wave gearing flatter and more compact and that makes it possible to ensure strength for supporting a rotation-transmitting member.

Means of Solving the Problems

According to the present invention, there is provided a strain wave gearing having a rotation-transmitting member for transmitting rotation in a direction orthogonal to a rotation central axis,
the strain wave gearing being characterized by being provided with:
a rigid internally toothed gear;
a flexible externally toothed gear arranged coaxially inside the internally toothed gear, the externally toothed gear being cup-shaped and being capable of flexing in a radial direction;
a wave generator fitted inside the externally toothed gear, the wave generator causing the externally toothed gear to flex into a non-circular shape and partially mesh with the internally toothed gear;
an input shaft extending coaxially from the wave generator toward a first side, which is one side in an axial direction that follows the rotation central axis;
an output shaft coaxially attached from the first side in the axial direction to a boss defining a central portion of a bottom section of a cup shape of the externally toothed gear; and
a cover plate attached to the internally toothed gear from a second side, which is opposite from the first side in the axial direction, the cover plate covering the internally toothed gear, the externally toothed gear, and the wave generator from the second side,
a shaft distal-end section of the input shaft protruding toward the first side through a central hole passing through the boss and the output shaft, and
the rotation-transmitting member being coaxially attached to the shaft distal-end section of the input shaft.
Additionally, in the strain wave gearing:
a shaft end section on the wave-generator side of the input shaft is rotatably supported by the boss of the externally toothed gear, or by the cover plate, via a first bearing; and
the shaft distal-end section of the input shaft is rotatably supported by the output shaft via a second bearing.

In the strain wave gearing according to the present invention, the rotation-transmitting member and the output shaft are arranged on one axial-direction side of the cup-shaped externally toothed gear; i.e., the distal-end-section side of the input shaft. The other axial-direction side of the cup-shaped externally toothed gear is covered by the cover plate, making it possible to omit an oil seal or other seal structure for preventing leakage of oil from the interior of the strain wave gearing to the exterior. Thus, this configuration is advantageous for making the strain wave gearing smaller and flatter.

The input shaft, which transmits input rotation from the rotation-transmitting member to the wave generator, also functions as a support shaft for both the rotation-transmitting member and the wave generator and is supported at both ends by the first and second bearings. Thus, a mechanism for transmitting rotation from the rotation-transmitting member to the wave generator, and a mechanism for supporting these elements, can be made compact, and strength for supporting the rotation-transmitting member and the wave generator can be ensured.

BEST MODE FOR CARRYING OUT THE INVENTION

Strain wave gearings according to embodiments of the present invention are described below with reference to the accompanying drawings. Each of the embodiments indicates an example of the present invention, but the present invention is not intended to be limited to the structures in the embodiments.

Embodiment 1

Figure 1:
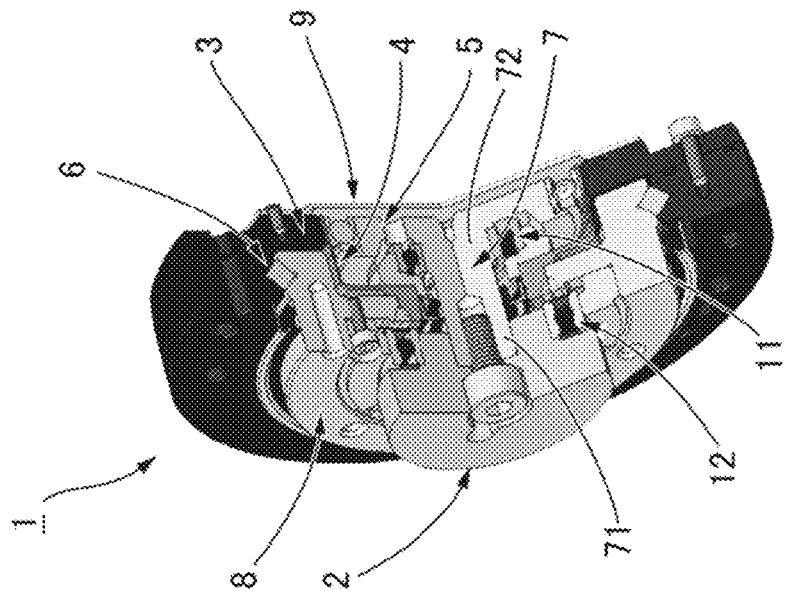
FIG. 1(A) is a schematic longitudinal cross-sectional view of a strain wave gearing according to embodiment 1.
FIG. 1(B) is an explanatory diagram showing the internal structure of the strain wave gearing.
Figure 1:
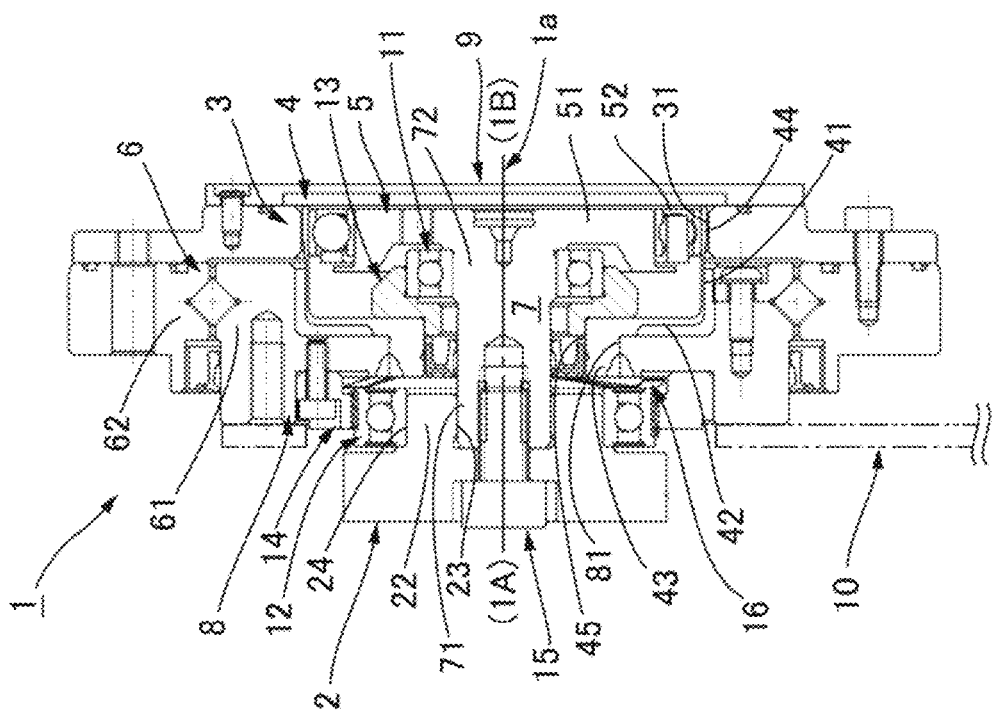
Figure 5A:
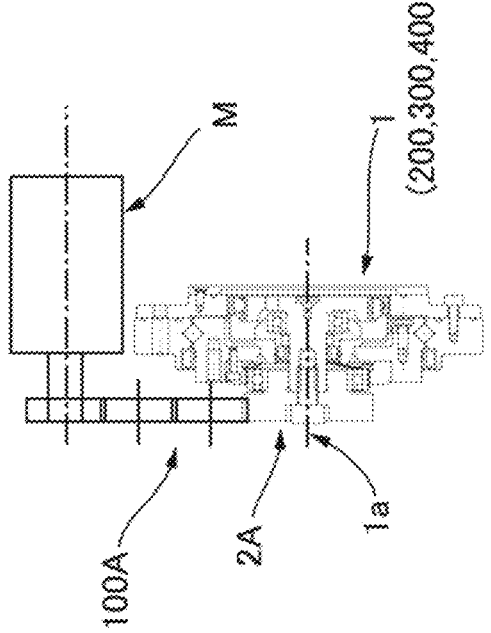
FIGS. 5(A) and 5(B) are explanatory diagrams showing an example of the configuration of an actuator provided with a strain wave gearing and a motor.
Figure 5B:
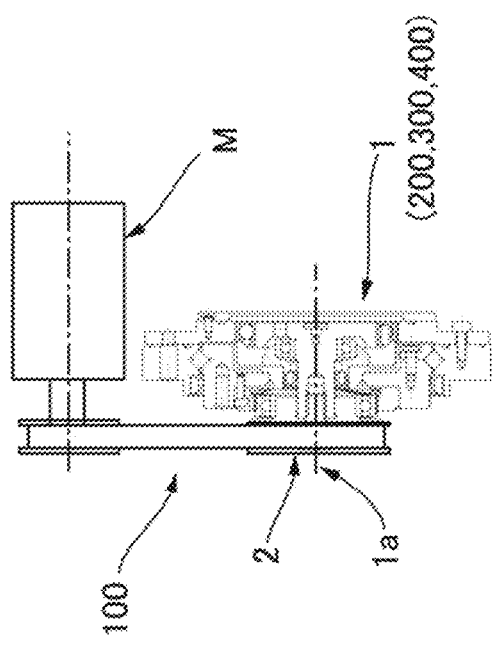

A strain wave gearing according to an embodiment of the present invention is described with reference to FIGS. 1 and 5. The strain wave gearing 1 is provided with a pulley 2 that is a rotation-transmitting member for transmitting rotation in a direction orthogonal to a rotation central axis 1a. As shown in FIG. 5(A), rotation is transmitted from a motor M, which is arranged in parallel at a position adjacent to the strain wave gearing 1, to the pulley 2 via a pulley-and-belt-type rotation-transmitting mechanism 100. As shown in FIG. 5(B), a gear train 100A can also be used as a rotation-transmitting mechanism. When a gear train 100A is used, a driven-side gear 2A is attached to the strain wave gearing 1 in lieu of the pulley 2.

As shown in FIGS. 1(A) and 1(B), the strain wave gearing 1 is provided with: a rigid internally toothed gear 3; a flexible externally toothed gear 4 arranged coaxially inside the internally toothed gear 3, the externally toothed gear 4 being cup-shaped and being capable of flexing in a radial direction; and a wave generator 5 fitted inside the externally toothed gear 4, the wave generator 5 causing the externally toothed gear 4 to flex into a non-circular shape and partially mesh with the internally toothed gear 3. The internally toothed gear 3 and the externally toothed gear 4 are supported in a state that allows relative rotation by a main bearing 6 formed from a cross-roller bearing. An input shaft 7 is coaxially attached to the wave generator 5, and the pulley 2 is attached to the input shaft 7. The internally toothed gear 3 is a stationary-side member attached to a fixed-side member (not shown), and the externally toothed gear 4 is a driven-side member. An output shaft 8 is coaxially attached to the externally toothed gear 4. The output shaft 8 is formed integrally with an inner race 61 of the main bearing 6; however, the output shaft 8 and the inner race 61 may be produced as separate members and coaxially fixed together. A cover plate 9 is arranged on the end of the strain wave gearing 1 that is opposite from the pulley 2.

Input rotation transmitted to the pulley 2 from the exterior is transmitted to the wave generator 5 via the input shaft 7. When the wave generator 5 rotates, positions at which the externally toothed gear 4 meshes with the internally toothed gear 3 move in the circumferential direction, and the two gears undergo relative rotation that corresponds to the difference between the numbers of teeth of the two gears. The externally toothed gear 4 rotates at a speed that is greatly reduced relative to the input rotation. A load-side member 10 is linked to the output shaft 8 attached to the externally toothed gear 4, as indicated by virtual lines, and reduced rotation is outputted from the output shaft 8 to the load-side member 10. Driving of an actuator provided with the motor M and the wave generator 5 is controlled such that the load-side member 10 turns within a limited-angle range so as not to interfere with members constituting the motor or the pulley-and-belt-type transmission mechanism.

The internally toothed gear 3 of the strain wave gearing 1 is annular, internal teeth 31 being formed on the inner peripheral surface thereof. The externally toothed gear 4 is provided with a radially flexible cylindrical barrel part 41, a diaphragm 42 extending radially inward from one end of the cylindrical barrel part 41, and an annular rigid boss 43 formed integrally with the inner peripheral edge of the diaphragm 42. External teeth 44 capable of meshing with the internal teeth 31 of the internally toothed gear 3 are formed on an outer-peripheral-surface portion of an open end that is the other end of the cylindrical barrel part 41. The wave generator 5 is provided with a rigid cam plate 51, and a wave generator bearing 52 mounted on the non-circular outer peripheral surface of the cam plate 51. The non-circular outer peripheral surface is, e.g., ellipsoidal, and is fitted into the open-end side of the cylindrical barrel part 41 of the externally toothed gear 4 in a state in which the outer peripheral surface of the wave generator bearing 52 is flexed in an ellipsoidal shape. A portion of the externally toothed gear 4 where the external teeth 44 are formed is thereby flexed into an ellipsoidal shape, yielding a state in which portions of the external teeth 44 positioned at the two ends of the long axis of the ellipsoidal shape mesh with the internal teeth 31. When the wave generator 5 rotates, the positions of meshing between the two gears 3, 4 move in the circumferential direction.

The input gear 7 is formed integrally with the cam plate 51 of the wave generator 5. The input shaft 7 extends coaxially from the cam plate 51 toward the boss 43, which defines a central portion of a cup bottom section of the cup shape of the externally toothed gear 4. Specifically, the input shaft 7 extends from the cam plate 51 toward a first side LA, which is one side in an axial direction following the rotation central axis 1a. The input shaft 7 can also be produced as a separate member and securely fastened to the cam plate 51. The input shaft 7 extends toward the first side LA through a central hole 45 in the annular boss 43 defining the central portion of the bottom section of the cup shape of the externally toothed gear 4. The pulley 2, which is a rotation-transmitting member, is securely fastened, using fastening bolts 15, coaxially to a shaft distal-end section 71 of the input shaft 7 protruding toward the first side LA from the central hole 45 in the boss 43 of the externally toothed gear 4.

The main bearing 6 supporting the internally toothed gear 3 and the externally toothed gear 4 in a state that allows relative rotation is arranged on the first side LA in the axial direction relative to the internally toothed gear 3. An outer race 62 of the main bearing 6 is securely fastened coaxially to the internally toothed gear 3. The output shaft 8 is formed integrally with the inner race 61 of the main bearing 6, as mentioned previously. The output shaft 8 is coaxially fixed to the boss 43 of the externally toothed gear 4 from the first side LA. In the present example, an inner peripheral edge portion of a central hole 81 in the output shaft 8 is joined, through full-circle welding, to an outer peripheral edge portion of the boss 43 of the externally toothed gear 4. It is also possible to join these elements using fastening bolts or the like.

The cover plate 9 is securely fastened to an end surface of the internally toothed gear 3 from a second side 1B, which is opposite from the first side 1A in the axial direction. The cover plate 9 covers the internally toothed gear 3, the externally toothed gear 4, and the wave generator 5 from the second side 1B.

A shaft end section 72 on the wave-generator 5 side of the input shaft 7 is rotatably supported by the boss 43 of the externally toothed gear 4 via a first bearing 11 formed from a ball bearing. In the present example, a first bearing holder 13 is coaxially fixed to the boss 43 of the externally toothed gear 4 from the second side 1B. The first bearing 11 is mounted between the first bearing holder 13 and the outer peripheral surface of the shaft end section 72 of the input shaft 7.

A shaft distal-end section 71 on the pulley 2 side of the input shaft 7 is rotatably supported by the output shaft 8 via a second bearing 12 formed from a ball bearing. A pulley shaft part 22 protruding from the end surface of the pulley 2 toward the second side 1B is formed on the pulley 2, and the shaft distal-end section 71 of the input shaft 7 is fitted coaxially into a central hole 23 in the pulley shaft part 22. While these elements are fitted together, the pulley 2 is securely fastened coaxially to the input shaft 7 by the fastening bolts 15. A bearing mounting surface 24 is formed on the circular outer peripheral surface of the pulley shaft part 22. A second bearing holder 14 is securely fastened coaxially to an end surface on the first side 1A of the output shaft 8. The second bearing 12 is mounted between the bearing mounting surface 24 on the pulley 2 side and the second bearing holder 14 on the output-shaft 8 side.

A wave washer 16 for applying precompression in the axial direction is sandwiched between the pulley 2 attached to the input shaft 7 and the output shaft 8 (boss 43 of the externally toothed gear 4). The precompression yields a state in which axial-direction rattling of the wave generator 5 supported by the first and second bearings 11, 12 is eliminated, the components being fixed through adhesion or the like while in this state. This obviates the need for, inter alia, an operation for adjusting the axial-direction position of the wave generator 5.

In the strain wave gearing 1 configured as described above, the pulley 2 and the output shaft 8 are arranged on one axial-direction side of the cup-shaped externally toothed gear 4; i.e., the distal-end-section 71 side of the input shaft 7. The input shaft 7, which transmits input rotation from the pulley 2 to the wave generator 5, functions as a support shaft for both the pulley 2 and the wave generator 5 and is supported at both ends by the first and second bearings 11, 12. Thus, a mechanism for transmitting rotation from the pulley 2 to the wave generator 5, and a mechanism for supporting these elements, can be made compact, and strength for supporting the pulley 2 and the wave generator 5 can be ensured. Additionally, the second side 1B in the axial direction of the strain wave gearing 1 is covered by the cover plate 9, making it possible to omit an oil seal or other seal structure for preventing leakage of oil from the interior of the strain wave gearing 1 to the second side 1B. Thus, this configuration is advantageous for making the strain wave gearing 1 smaller and flatter.

Embodiment 2

Figure 2:
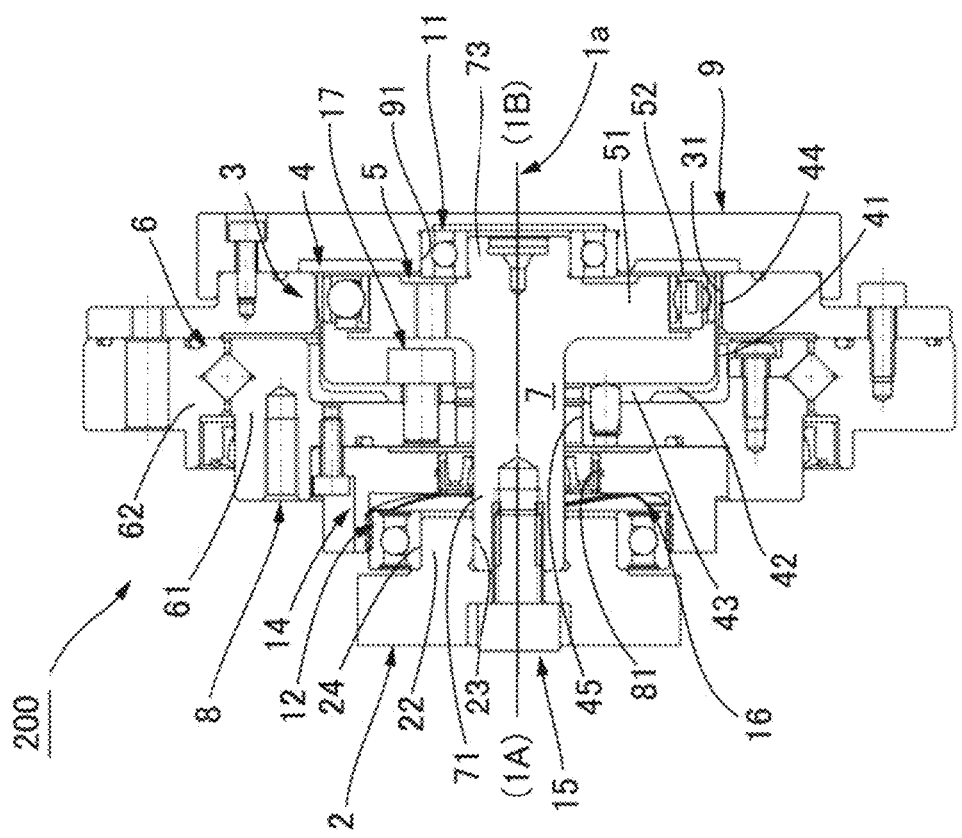
FIG. 2 is a schematic longitudinal cross-sectional view of a strain wave gearing according to embodiment 2.

FIG. 2 is a schematic longitudinal cross-sectional view of a strain wave gearing 200 according to embodiment 2. The basic configuration of the strain wave gearing 200 is identical to that of the strain wave gearing 1; therefore, identical reference symbols are assigned to corresponding portions, and these portions are not redundantly described.

In the strain wave gearing 200, a first bearing 11 supporting a wave generator 5 is arranged on a second side 1B in an axial direction relative to the wave generator 5 and is mounted on a cover plate 9. An input shaft 7 is provided with a shaft protruding section 73 that protrudes coaxially from a cam plate 51 of the wave generator 5 toward the second side 1B in the axial direction. A bearing mounting section 91 that opens on a first side 1A in the axial direction is formed on the cover plate 9. The shaft protruding section 73 of the input shaft 7 is supported by the first bearing 11 mounted on the bearing mounting section 91.

Additionally, in the strain wave gearing 200, an output shaft 8 formed integrally with an inner race 61 of a main bearing 6 is securely fastened to a boss 43 of an externally toothed gear 4 by fastening bolts 17 rather than through welding.

Embodiment 3

Figure 3:
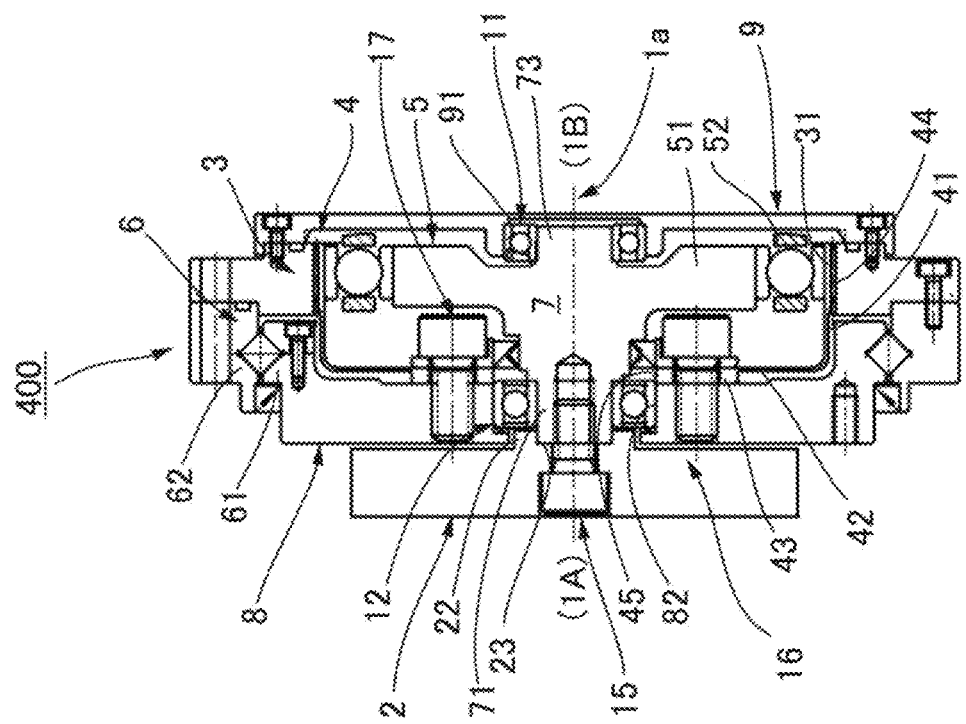
FIG. 3 is a schematic longitudinal cross-sectional view of a strain wave gearing according to embodiment 3.

FIG. 3 is a schematic longitudinal cross-sectional view of a strain wave gearing 300 according to embodiment 3. The basic configuration of the strain wave gearing 300 is identical to that of the strain wave gearing 1; therefore, identical reference symbols are assigned to corresponding portions, and these portions are not redundantly described.

In the strain wave gearing 300, a first bearing 11 supporting a wave generator 5 is arranged on a second side 1B in a axial direction relative to the wave generator 5 and is mounted on a cover plate 9. An input shaft 7 is provided with a shaft protruding section 73 that protrudes coaxially from a cam plate 51 of the wave generator 5 toward the second side 1B in the axial direction. A bearing mounting section 91 that opens on a first side 1A in the axial direction is formed on the cover plate 9. The shaft protruding section 73 of the input shaft 7 is supported by the first bearing 11 mounted on the bearing mounting section 91.

Additionally, in the strain wave gearing 300, an output shaft 8 formed integrally with an inner race 61 of a main bearing 6 is securely fastened to a boss 43 of an externally toothed gear 4 by fastening bolts 17 rather than through welding.

Furthermore, in the strain wave gearing 300, a second bearing 12 is mounted between a shaft distal-end section 71 of the input shaft 7 and a second bearing holder 14. Specifically, the second bearing 12 is positioned on the second side 1B in the axial direction relative to a pulley 2 and supports the shaft distal-end section 71 of the input shaft 7.

Embodiment 4

Figure 4:
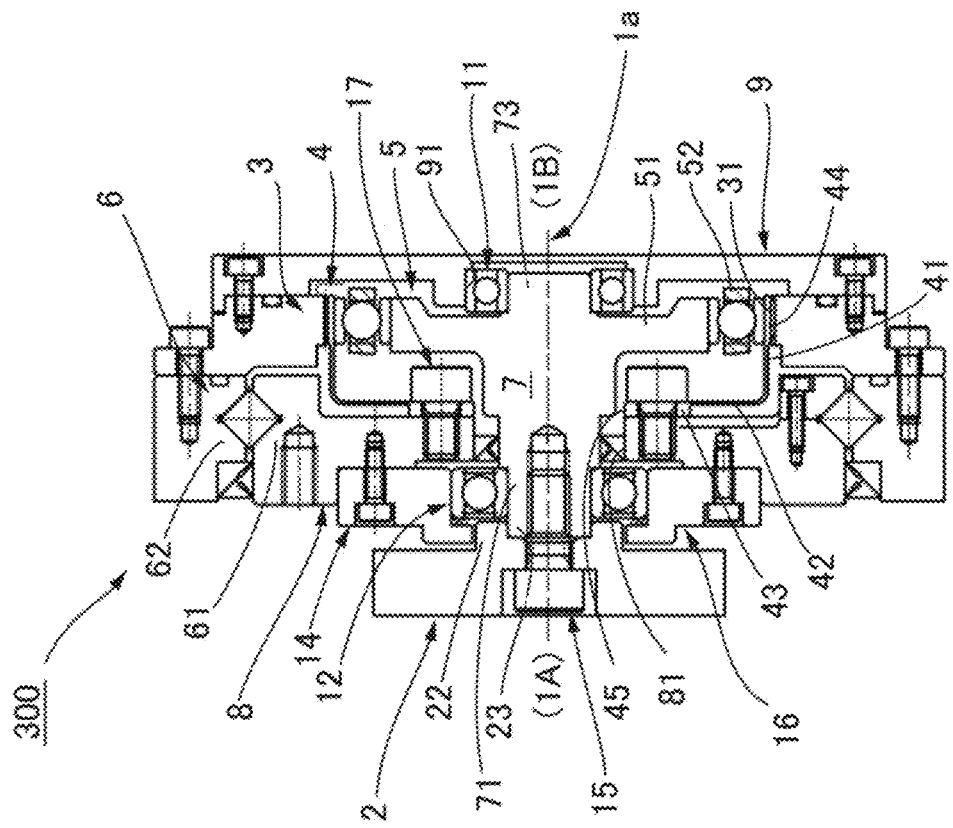
FIG. 4 is a schematic longitudinal cross-sectional view of a strain wave gearing according to embodiment 4.

FIG. 4 is a schematic longitudinal cross-sectional view of a strain wave gearing 400 according to embodiment 4. The basic configuration of the strain wave gearing 400 is identical to that of the strain wave gearing 1; therefore, identical reference symbols are assigned to corresponding portions, and these portions are not redundantly described.

In the strain wave gearing 400, a first bearing 11 supporting a wave generator 5 is arranged on a second side 1B in an axial direction relative to the wave generator 5 and is mounted on a cover plate 9. An input shaft 7 is provided with a shaft protruding section 73 that protrudes coaxially from a cam plate 51 of the wave generator 5 toward the second side 1B in the axial direction. A bearing mounting section 91 that opens on a first side 1A in the axial direction is formed on the cover plate 9. The shaft protruding section 73 of the input shaft 7 is supported by the first bearing 11 mounted on the bearing mounting section 91.

Additionally, in the strain wave gearing 400, an output shaft 8 formed integrally with an inner race 61 of a main bearing 6 is securely fastened to a boss 43 of an externally toothed gear 4 by fastening bolts 17 rather than through welding.

Furthermore, in the strain wave gearing 400, a bearing mounting surface 82 is formed on an inner peripheral surface of a central hole in the output shaft 8 formed integrally with the inner race 61. A second bearing 12 is mounted on the bearing mounting surface 82 of the output shaft 8 and supports a shaft distal-end section 71 of the input shaft 7.

The invention claimed is:

1. A strain wave gearing provided with a rotation-transmitting member for transmitting rotation in a direction orthogonal to a rotation central axis, the strain wave gearing comprising:
   a rigid internally toothed gear;
   a flexible externally toothed gear arranged coaxially inside the internally toothed gear, the externally toothed gear being cup-shaped and being capable of flexing in a radial direction;
   a wave generator fitted inside the externally toothed gear, the wave generator causing the externally toothed gear to flex into a non-circular shape and partially mesh with the internally toothed gear;
   an input shaft extending coaxially from the wave generator toward a first side, which is one side in an axial direction that follows the rotation central axis;
   an output shaft coaxially attached from the first side in the axial direction to a boss defining a central portion of a bottom section of the cup shape of the externally toothed gear;
   a cover plate attached to the internally toothed gear from a second side, which is opposite from the first side in the axial direction, the cover plate covering the internally toothed gear, the externally toothed gear, and the wave generator from the second side, and
   a first bearing and a second bearing for rotatably supporting the input shaft,
   wherein
   the input shaft is provided with a shaft end section extending from the wave generator and a shaft distal-end section extending from the shaft end section toward the first side through a central through hole formed in the boss;
   the rotation-transmitting member is provided with a shaft part protruding toward the second side, and a central hole formed in the shaft part opening toward the second side;
   the shaft distal-end section of the input shaft is fitted coaxially into the central hole of the shaft part of the rotation-transmitting member;
   the shaft end section of the input shaft is rotatably supported by the boss of the externally toothed gear via the first bearing positioned between the wave generator and the boss in the axial direction; and
   the shaft distal-end section of the input shaft is rotatably supported by the output shaft via the second bearing, the second bearing being mounted between the shaft part of the rotation-transmitting member and the output shaft, and the output shaft, the second bearing and the shaft part of the rotation-transmitting member being disposed concentrically in the radial direction.

2. The strain wave gearing according to claim 1, further comprising a main bearing for supporting the internally toothed gear and the externally toothed gear in a state that allows relative rotation, wherein:
   the main bearing is arranged on the first side relative to the internally toothed gear;
   an outer race of the main bearing is coaxially attached to the internally toothed gear; and
   the output shaft is coaxially attached to an inner race of the main bearing, or the output shaft is formed integrally with the inner race.

3. The strain wave gearing according to claim 1, further comprising:
   a wave washer positioned between the rotation-transmitting member fixed to the input shaft and the output shaft fixed to the boss of the externally toothed gear,
   wherein
   the wave washer applies axial-direction precompression for absorbing axial-direction rattling of the wave generator.

4. The strain wave gearing according to claim 1, further comprising a first bearing holder, wherein:
   the first bearing holder is coaxially attached to the boss of the externally toothed gear from the second side, and
   the first bearing is mounted between the first bearing holder and the shaft end section of the input shaft.

5. The strain wave gearing according to claim 1, further comprising:
   a bearing mounting surface formed on an outer peripheral surface of the rotation-transmitting member; and
   a second bearing holder coaxially attached to the output shaft from the first side, wherein
   the second bearing is mounted between the bearing mounting surface and the second bearing holder.

6. The strain wave gearing according to claim 1, further comprising:
   a bearing mounting surface formed on a circular outer peripheral surface of the shaft part; and
   a bearing holder disposed radially inside the output shaft and fastened coaxially to the output shaft,
   the second bearing being mounted between the bearing mounting surface and the bearing holder in the radial direction.

* * * * *